United States Patent [19]
Reuber et al.

[11] Patent Number: 5,409,260
[45] Date of Patent: Apr. 25, 1995

[54] SWINGABLE PASSENGER RETAINING SYSTEM FOR AUTOMOTIVE VEHICLES

[75] Inventors: Gerhardt Reuber, Drolshagen; Achim Braun, Numbrecht; Siegfried Baier, Reichshof-Mittelagger, all of Germany

[73] Assignee: Alfred Teves GmbH & Co. OHG, Germany

[21] Appl. No.: 930,675

[22] PCT Filed: Oct. 30, 1991

[86] PCT No.: PCT/EP91/02051
§ 371 Date: Mar. 22, 1993
§ 102(e) Date: Mar. 22, 1993

[87] PCT Pub. No.: WO92/13739
PCT Pub. Date: Aug. 20, 1992

[30] Foreign Application Priority Data
Feb. 1, 1991 [DE] Germany ............ 41 02 982.8

[51] Int. Cl.6 ............................................. B60R 21/04
[52] U.S. Cl. ........................... 280/753; 280/748; 280/751
[58] Field of Search ............ 280/748, 751, 752, 753; 296/73

[56] References Cited

U.S. PATENT DOCUMENTS

| 2,883,123 | 4/1959 | Finnigan. | |
|---|---|---|---|
| 3,776,359 | 12/1973 | Breitschwerdt | 280/753 |
| 4,023,643 | 5/1977 | Bagley, Jr. | 280/753 |
| 4,198,075 | 4/1980 | Kob et al. | 280/753 |
| 4,951,963 | 8/1990 | Behr et al. | |

FOREIGN PATENT DOCUMENTS

| 1124164 | 10/1956 | France. | |
|---|---|---|---|
| 2537212 | 3/1977 | Germany. | |
| 2634222 | 2/1978 | Germany. | |
| 3908713 | 10/1989 | Germany. | |
| 4201824 | 8/1992 | Germany | 280/751 |

*Primary Examiner*—Eric D. Culbreth
*Attorney, Agent, or Firm*—J. Gordon Lewis; Robert P. Seitter

[57] ABSTRACT

A retaining system for passengers of an automotive vehicle in which an impact element, which is movable toward the part of the body to be retained in case of a crash, is fixed to the vehicle in front of the passenger of the vehicle and is moved into position to block the space in front of the seat on which the passenger is seated only in a crash situation. This retaining system is intended to prevent the so-called "submerging" effect, by which a passenger slides into the space in front of the seat upon which the passenger is seated in a crash situation. The retaining system includes an impact element which is swingable toward the passenger about an axis which extends transversely to the longitudinal axis of the vehicle. If the interior design of the vehicle requires, the impact element can be arranged to undergo translatory movement in the direction of the passenger in addition to the swinging movement.

25 Claims, 7 Drawing Sheets

SWINGABLE PASSENGER RETAINING SYSTEM FOR AUTOMOTIVE VEHICLES

BACKGROUND OF THE INVENTION

The present invention relates to a passenger retaining system intended to retain the passengers in a vehicle in the event of a crash of the vehicle. Seat belts are an example of such systems. More recently, air bags, which are installed in the driving direction in front of the passengers and which are inflated in crash situations, have come into use to retain passengers. A disadvantage of the prior-art seat belts is that they are not fastened in many instances and, therefore, are not effective when not fastened. In the case of air bags, there is the risk that; due to their explosion-like expansion and the high pressure which is brought about, the potential for panic by the passengers is increased. Moreover, both prior-art measures will not, in all instances, avoid the possibility of the passenger sliding through the belt or the air bag to below the seat and into the foot space of the vehicle and against an interior vehicle surface without protection.

In German patent application published without examination, No. 2,537,212, a retaining system is disclosed which, at the moment the driver gets into the vehicle, is extended into a position at a convenient distance from the knee or shin bone of the driver by means of an appropriate sensing device and is left there to prevent the driver from sliding down into the space in front of the seat in the event of a crash. Among the disadvantages of a system of this kind are the constant appearance of the retaining system and the constant limited freedom of movement of the passengers, with the likelihood that, during the whole service life of the vehicle, the dangerous situation to be prevented may very well never occur at all.

SUMMARY OF THE INVENTION

The present, therefore, has as an object to improve the state-of-the-art retaining systems.

This object is achieved, in accordance with the present invention, by an impact element which is only swung out in case of a dangerous situation and an elevated acceleration. This swinging motion, which involves only slight movement of the impact element requires comparatively low energy consumption, since lower forces of acceleration will be needed. In addition, the movement of the impact element takes place only at the moment of an imminent dangerous situation, so that during the rest of the time the passenger has freedom of motion. Also, the extending motion of the retaining system is not influenced by the passenger, so that human failure will not prove to be of disadvantage.

The present invention prevents passengers from hitting the front window of the vehicle and the well-known effect of "submerging" (i.e. the passenger sliding down into the space in front of the seat).

According to a preferred aspect of the present invention, the impact element undergoes translatory movement toward the passenger as well as swinging movement. This permits shaping the impact element to adapt it to the stature of a human being.

The two movements of the impact element (i.e. extending and swinging) can take place successively when, for example, the geometric structure of the vehicle is such that the impact element must be first moved into a position before it has room to swing, or, else, the two movements of the impact element can take place simultaneously if the geometric structure of the vehicle permits.

The impact element is preferably configured in the shape of a continuous plate in order to achieve the desired protection regardless of the seating position of the passenger. The design of the vehicle may, however, make it expedient to provide a plurality of smaller-size impact elements.

According to one embodiment of the present invention, the impact plate can serve as the bottom of the instrument section in the vehicle, including a glove box or the like.

According to another embodiment of the invention, the swivel axis lies in a plane above the passenger's knees.

By including an appropriate energy-consuming damping component in the retaining system of the present invention, the impact against the body part to be protected will not be excessive.

In its normal position, the swinging end of the impact element points substantially in the driving direction and, in case of danger, is swung out of this position to point downward toward the feet of the passenger.

In order to provide a space-saving accumulator arrangement which releases energy at a high speed, preferably the accumulator arrangement is incorporated in an actuating member which performs a linear motion which is transformed into a swinging motion of the impact plate by an appropriate positioning of the impact plate.

Preferably, swinging levers can be fixed symmetrically with the impact plate at the two ends of the impact plate and to the vehicle. According to another aspect of the present invention, through a supplementary tensioning device, the accumulators are loaded, and their loading is checked when the vehicle is started. The present invention is arranged so that the impact element travels as near as possible to the parts of the body of the passenger which are to be protected. In this way, the distance of movement of the parts of the body to be protected, before they come into contact with the retaining device, will be reduced greatly.

The present invention incorporates an especially simple device for synchronization of the actuating members propelling the impact plate and for loading the energy accumulators after an actuation of the retaining system.

Embodiments of the invention will be explained by making reference to the accompanying drawings.

DETAILED DESCRIPTION OF THE INVENTION

Figure 1:
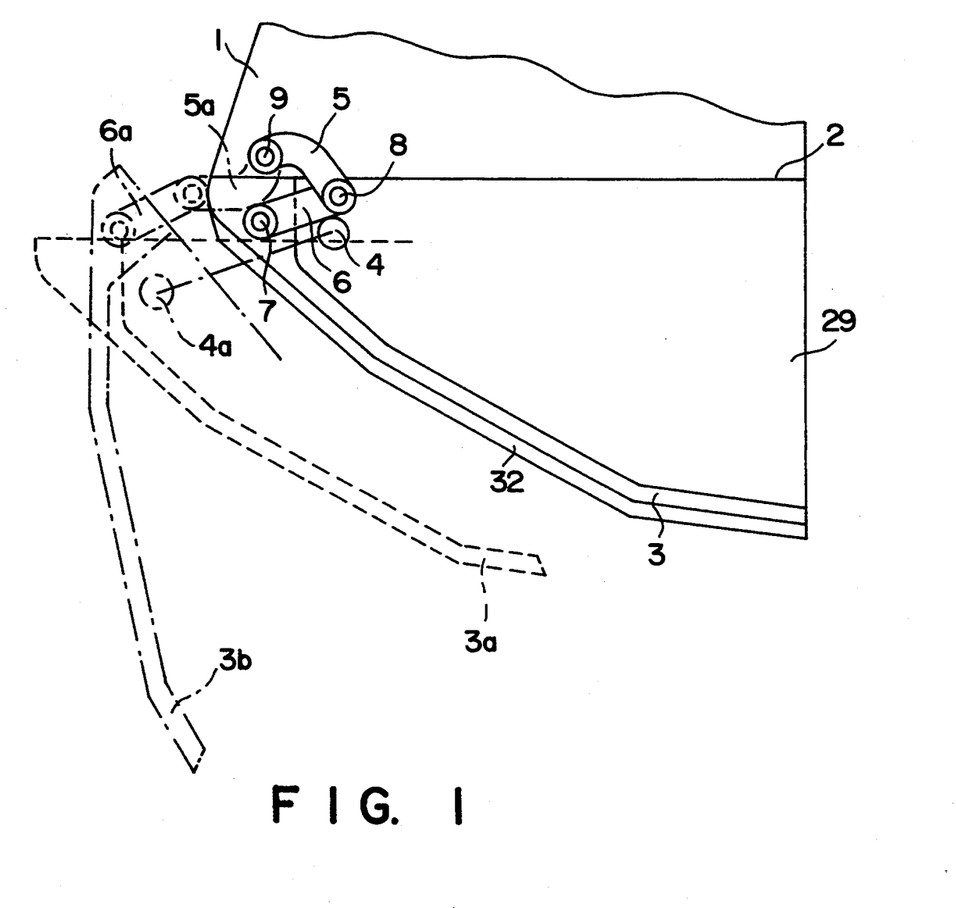
FIG. 1 is a diagrammatic and partly broken-away illustration of the swinging mechanism of an impact plate which is fixed to the lateral walls and to the instrument panel of a vehicle in accordance with the present invention.

FIG. 1 shows a lateral wall 29 of the automotive vehicle and part of the instrument panel 1. At the instrument panel 1, a swinging lever 5 is pivoted on a hinge 9. At the other end of the swinging lever 5, the end of an impact element 3, which points toward the instrument panel 1, is pivoted, through a second swinging lever 6, about a second hinge 8. An energy-consuming damping material 32 is attached to the impact element 3 to reduce the impact upon the passenger in a crash situation. An end of the impact element 3, which is configured in the shape of an impact plate, is caught by a swivel axis 4. Swivel axis 4 is shiftable in a linear direction by an extending motion under the action of an actuating member which is not shown in FIG. 1. By such a shift, the swivel axis 4 moves to position 4a. Without the effect of the swinging levers 5, 6, such a shift would cause the impact plate 3 to assume the position 3a which is shown by a dashed line.

This does not, however, take into account the effect of the two swinging levers 5 and 6 which cause the impact plate 3 to perform a swinging motion in addition to the translatory shift. Due to the effect of the swinging levers 5, 6, the swivel axis 4 will, after the shift, assume the position 4a and the component parts 3, 4, 5, and 6 will, after the shift, assume the positions shown by dashdotted lines and identified by the reference numbers 3b, 4a, 5a, and 6a.

The benefit provided by the swinging levers will be appreciated. Instead of the plate 3 moving back too far to a position at which plate 3 hits the passenger and instead of plate 3 being disposed at an acute angle, in accordance with the present invention, the peak at the swivel end of the plate is moved toward the passenger sufficiently, while the foot space is blocked by the plate 3, thereby preventing the passenger from sliding into the foot space in case of a crash.

Figure 2:
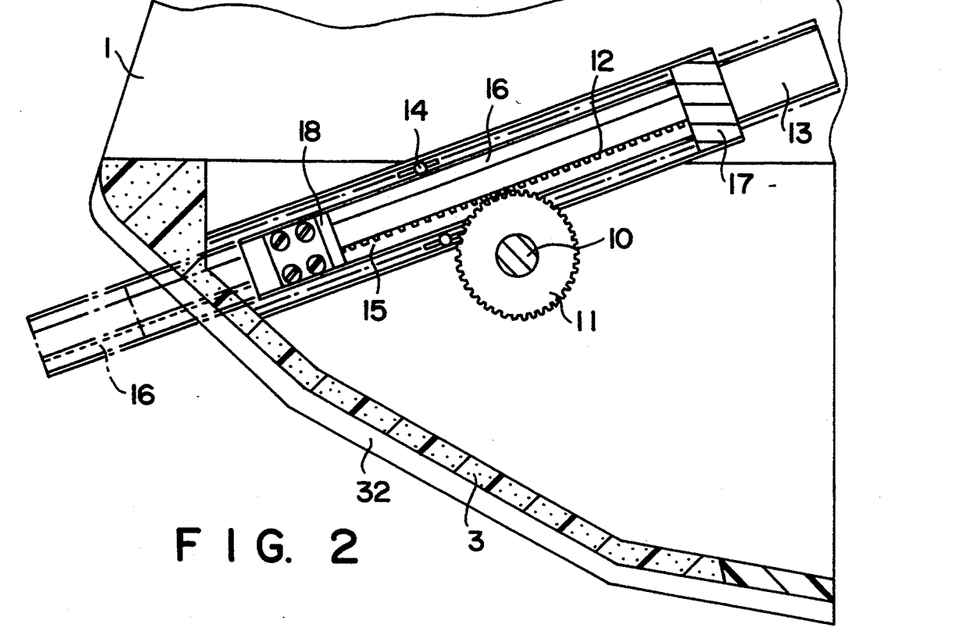
FIG. 2 is a partly cross-sectional and symbolic illustration of an actuating member for the generation of a linear motion which is transformed by the impact plate into a swinging motion and/or into a linear motion.

FIG. 2 shows the inventive impact mechanism by which the swivel axis 4 in FIG. 1 is brought into the position 4a and, consequently, the impact plate 3 is allowed to swing out. In this configuration, a beam 17, interconnecting the two lateral walls 29 of the passenger compartment, is connected to a guide bar 16. Guide bar 16 is comprised of a guide plate 13 at its outer edges, so that the latter is surrounded by the two lateral bar sections of the bar 16 and is positioned so as to be slidable in the longitudinal direction. A ball bearing, indicated by the ball 14, serves for smoother slidability.

Figures 5, 6:
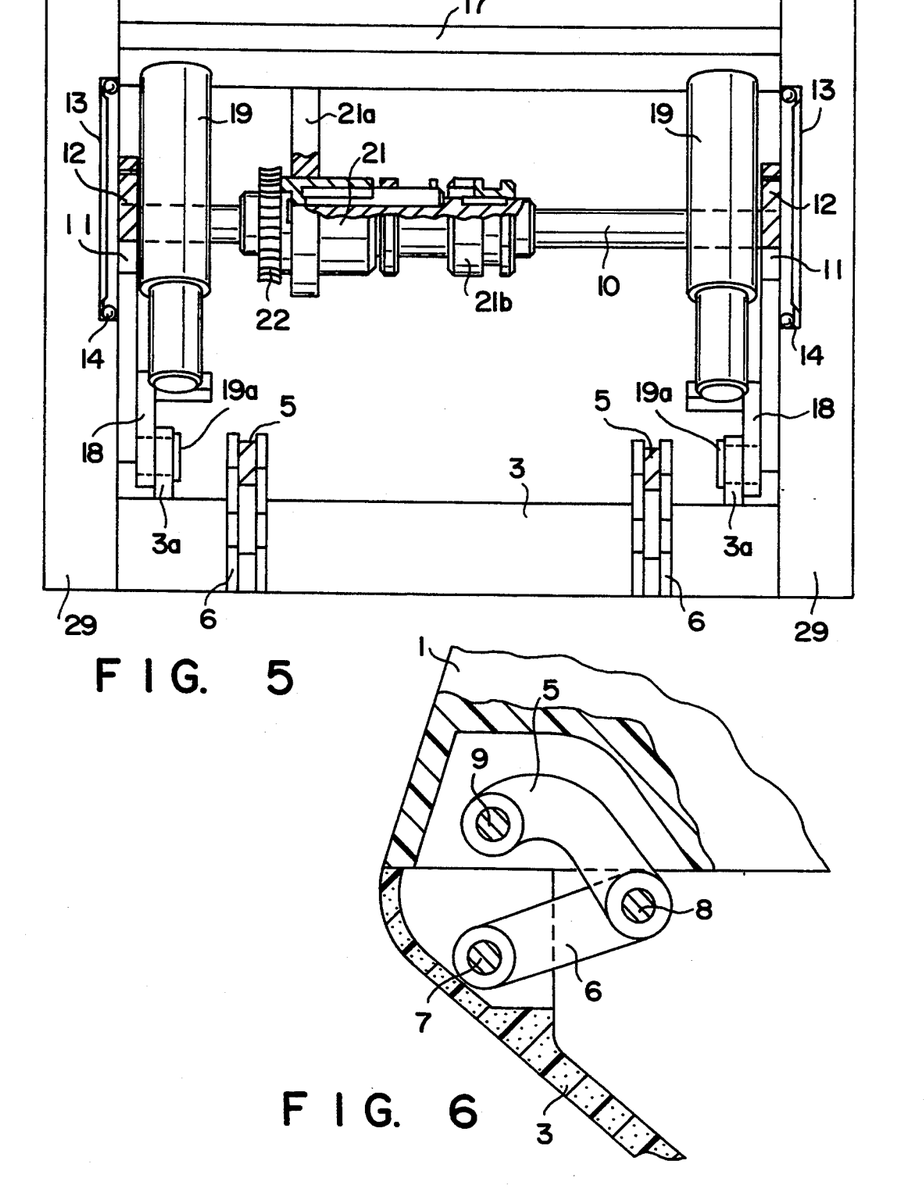
FIG. 5 is a symbolic representation of a top view of the retaining device with a motion control assembly and a device for loading the energy accumulators.
FIG. 6 shows the positioning of the swinging levers in FIG. 1 in an enlarged symbolic and broken-away representation.

A rotatable shaft 10 is mounted to the lateral walls 29. A driving gearwheel 11 is mounted on shaft 10. With its tooth flanks, the gearwheel meshes with a toothed rack 12 which is rigidly coupled to the guide plate 13. When the guide plate 13 is shifted to the left, as viewing the drawing, into the position identified by reference number 16 and shown by the dashdotted line, the shaft 10, serving as a synchronizing shaft, will be driven through the flanks of the gearwheel 11. Among the functions of the synchronizing shaft 10 is to synchronize the motion of a second actuating member, which is illustrated in FIG. 5 and is positioned symmetrically with respect of the impact plate 3, and the actuating member illustrated in FIG. 2. Neither of the two actuating members is capable of moving the associated guide plate 13 any faster than the other one.

Furthermore, a holding device 18, which is screwed onto the guide plate 13 and is in the shape of an angle, is shown in FIG. 2. The holding device serves as a point of action for an energy accumulator which is not illustrated in FIG. 2 and which, at its other end, takes support at the stationary beam 17, so that in the case of triggering, the energy accumulator will act on the holding device 18 and, in this manner, will move the guide plate 13 to the left as viewing FIG. 2.

Figure 3:
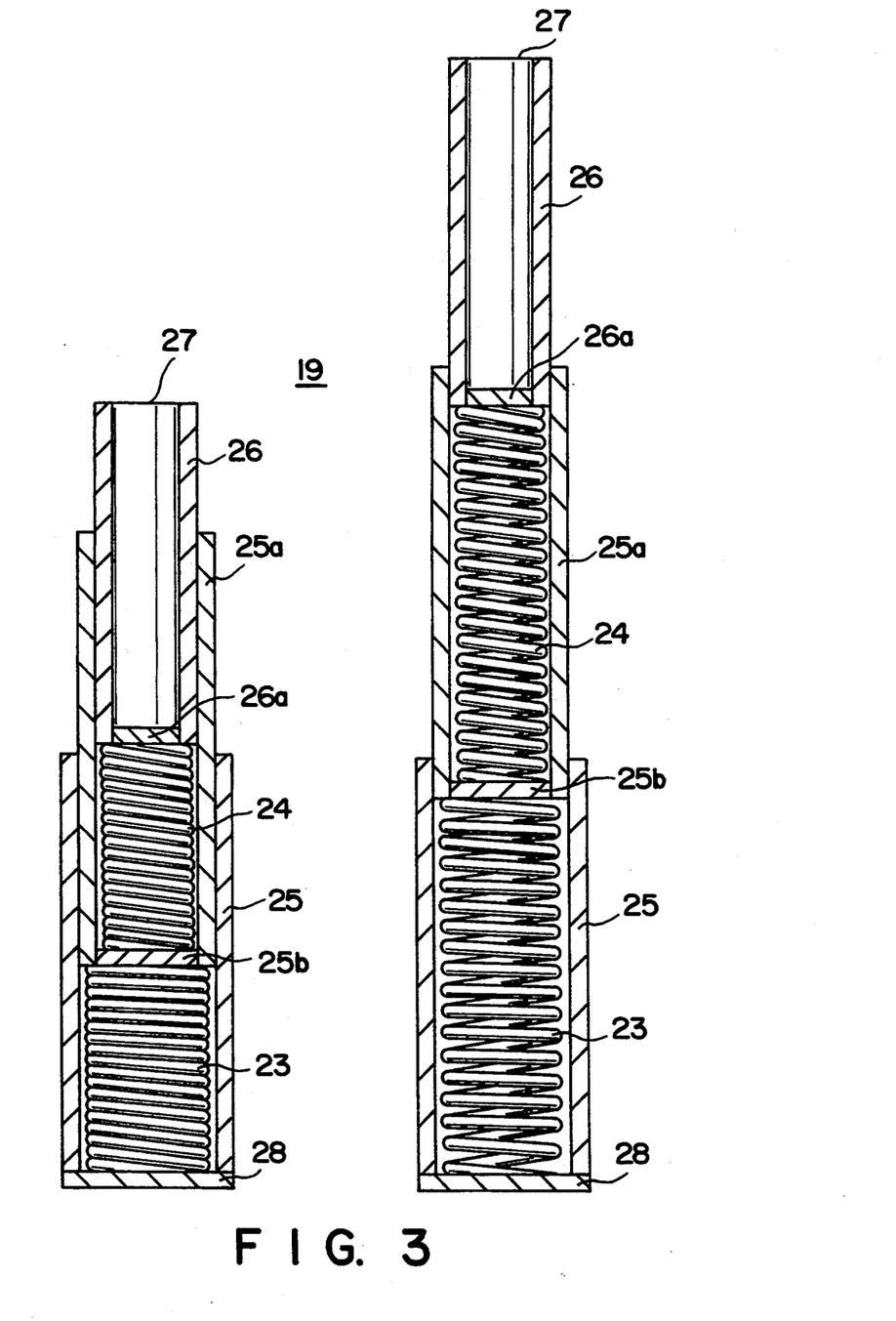
FIG. 3 shows an energy accumulator in the loaded and in the unloaded condition in a symbolic illustration.

In FIG. 3, the energy accumulator, which drives the actuating member, is shown both in the loaded condition and in the unloaded condition. The energy accumulator is composed of first, second and third cylindrical bushings 25, 25a and 26 which are telescoped into one another so as to be slidable. Each one of the three cylindrical bushings has a bottom, respectively, identified by reference numbers 28, 25b and 26a which close the bottoms of the cylindrical bushings, so that three bushings are created which are nested into one another and are open at their tops. Between the first bushing 25 and the second bushing 25a a first spring 23 is positioned, while between the second bushing 25a and the third bushing 26 a second spring 24 is placed. The two springs urge the bushings positioned above each of them to move outwardly. This is shown on the right in FIG. 3, with the open upper end 27 of the third bushing 26 at the maximum extension with respect of the bottom 28 of the first bushing 25.

The use of the telescoping energy accumulator according to FIG. 3 has the particular advantage that, on one hand, in its loaded condition the energy accumulator requires very little space and, on the other hand, the attainable acceleration is, indeed, especially high because, at the moment of triggering of the accumulator, the two springs which are seated within the internal bushings 25a and 25 can simultaneously release their tension and give the upper end 27 of the accumulator considerable speed.

Figure 4:
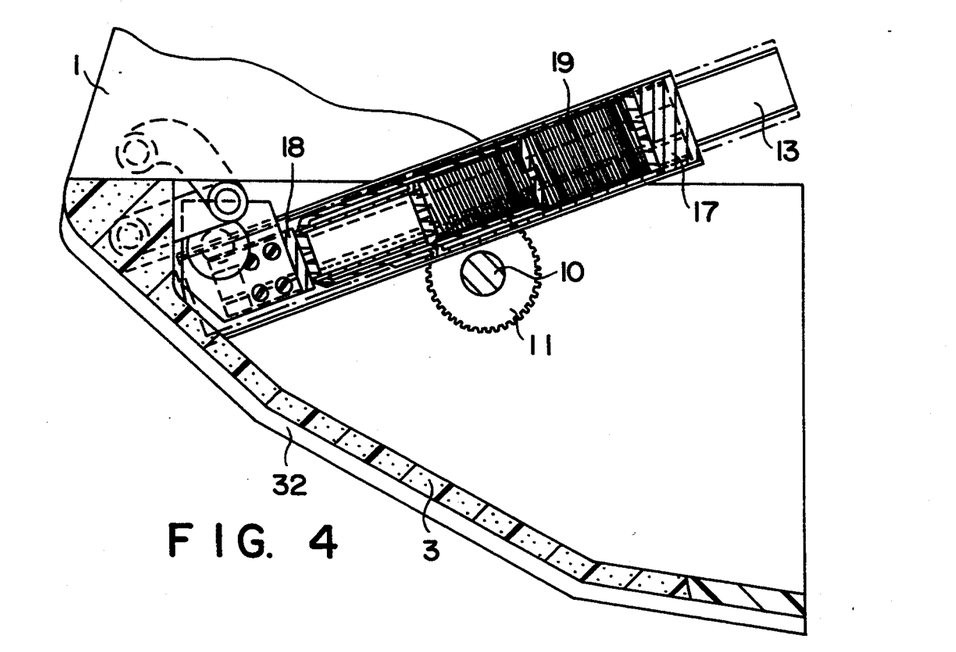
FIG. 4 is a symbolic illustration of the actuating member in FIG. 2 furnished with an energy accumulator, including the swinging levers of the impact plate in FIG. 1.

FIG. 4 shows the interaction of the energy accumulator 19 illustrated in FIG. 3 with the actuating member according to FIG. 2, which has already been described above. In addition, the position of the swinging levers, in the condition of rest of the retaining device, is outlined once more in a dashed line in FIG. 4. This applies to the swivel axis 4 which, also, is shown in FIG. 4 in a dashed line. Furthermore, FIG. 4 shows that the swivel axis 4 is driven by the front end of the guide plate 13 through the holding device 18 and by the energy accumulator 19.

As shown in FIG. 5, the lateral walls 29 are integrated in the instrument panel and rigidly coupled to the partition wall between the engine compartment and the passenger compartment. The rigidly mounted beam bridge 17, which has been called a "beam" in the foregoing text, is disposed between the lateral walls. The driving elements, namely spring telescoping accumulators 19, the bracket 21a for the accommodation of a coupling 21 and a further bracket for the return motors (which are not shown), are positioned on the beam bridge. The synchronizing shaft 10 is rotatably supported on both its ends in the lateral walls. The gearwheels 11 are disposed on shaft 10 below the toothed racks 12. The worm gear 22 is disposed aside the coupling for the return movement of the impact plate 3. The linear-motion guide elements 13, 14 are embedded in the lateral walls 29, with their sides 13 rigidly coupled to the walls. The toothed racks 12 are fixed on the sides 14. In this way, the toothed rack can move linearly when the synchronizing shaft is uncoupled. The L-shaped holders 18 are fixed on the toothed racks, with a bore for the accommodation of the pins 19a (axis) being disposed at the elongated sides of the L-shaped holders. The other side of the holder 18 is rigidly coupled to the front side of the telescoping drive 19.

The impact plate 3 is accommodated between the lateral walls so as to be movable. The lower cup-shaped portion of the plate extends approximately down to the beam bridge and forms the ceiling of the foot space. The impact plate is suspended to the brackets 3a, respectively to the pin 19a. The brackets 3a are anchored in the widened upper edge of the impact plate, where, as also shown in FIG. 6, the levers 6 (the first member of the swinging mechanism) are pivoted.

Figure 4A:
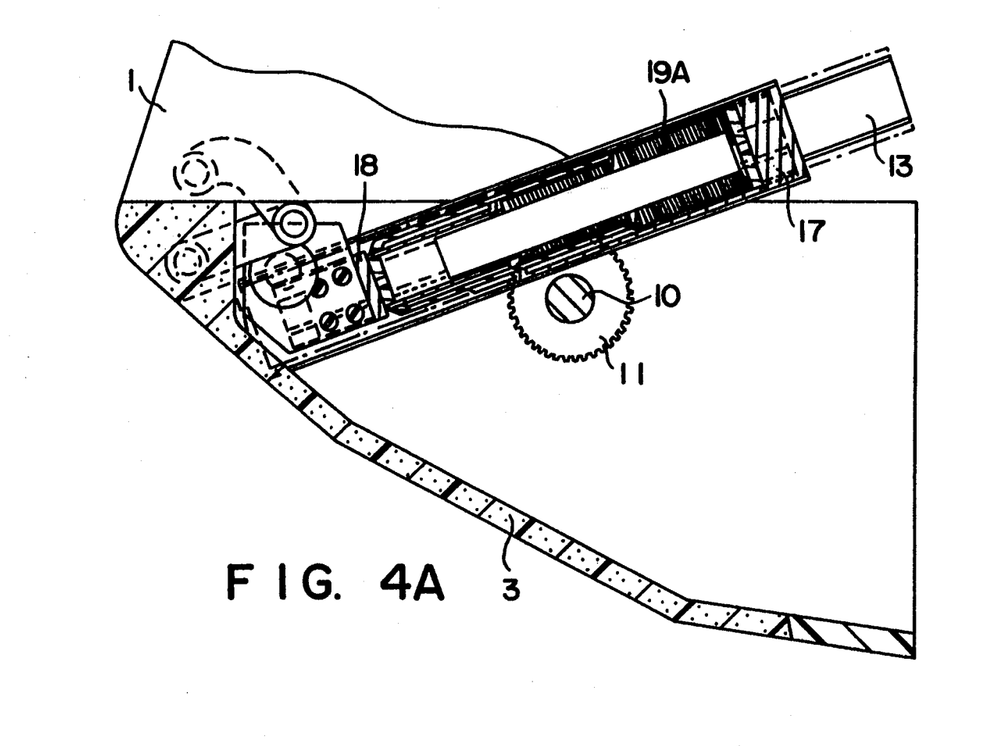
FIG. 4A is a symbolic illustration of the actuating member in FIG. 2 furnished with an alternative energy accumulator.

In this configuration, the sequence of motion is as follows:

In FIG. 5, the telescoping drives 19 are illustrated in the compressed condition. The spring force acts on the beam bridge 17 and on the holders 18 which are maintained in the tensioned, so-called "standby", position by the kinetic chain comprised of: toothed rack, gearwheel, synchronizing shaft, coupling. When the synchronizing shaft is disengaged by the coupling, the telescoping drive will expand, whereby the holders and the elements fixed to them, and, consequently, also the impact plate, will be pushed in the direction of one of the passengers of the vehicle. In the swinging mechanism, the maximum extension of the upper edge of the impact plate is shorter than the extension of the lower edge of the impact plate, and, consequently, a swivelling motion, respectively a swinging motion of the impact plate about the axis 19a will be generated. In this way, the impact plate will not only be pushed into the vicinity of the knees of the co-driver, but simultaneously the height of the foot space also will be reduced, whereby the vehicle In lieu of the drive described above, that is a drive which includes springs which are pre-stressed in the normal condition, an alternative arrangement can be as follows:

In contrast to the known springs, a torsion spring arrangement as well as a pneumatic drive 19A (FIG. 4A) can be used. Through the pneumatic pump, the knee projection device will be permitted to move by means of a cylinder with overpressure or with vacuum. Simultaneously, the pump will fill a pressure accumulator with approximately 3 bar pneumatic pressure. In the event of an imminent accident, the pressure accumulator will be actuated by a sensor through a pilot valve and the knee protection device will be extended within a short time. Thereafter, the knee protection device will be retracted again through the vacuum side of the pump.

In FIG. 6, the swinging mechanism, which has already been described in connection with FIG. 1, is again illustrated but on an enlarged scale. This mechanism includes the two swinging levers 5 and 6 and the axles constituting the corresponding hinges 7, 8, 9 as well as the impact plate 3 and the instrument panel 1.

Figure 7:
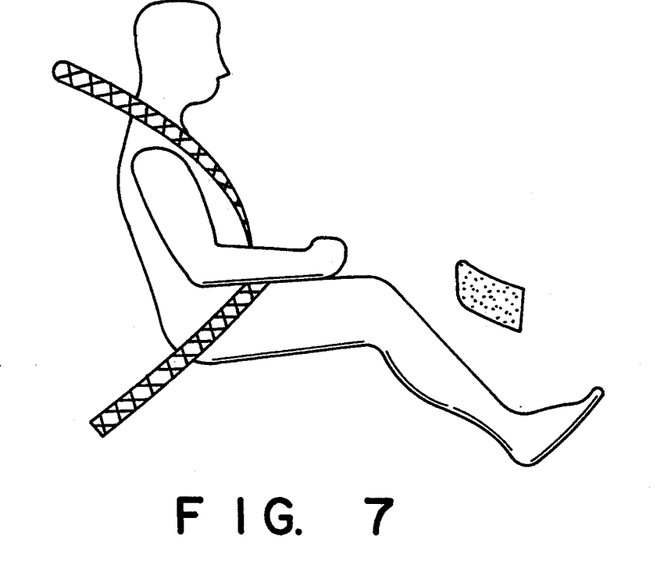
FIG. 7 shows the impact element relative to the seating position of a passenger in a non-dangerous situation.
Figure 8:
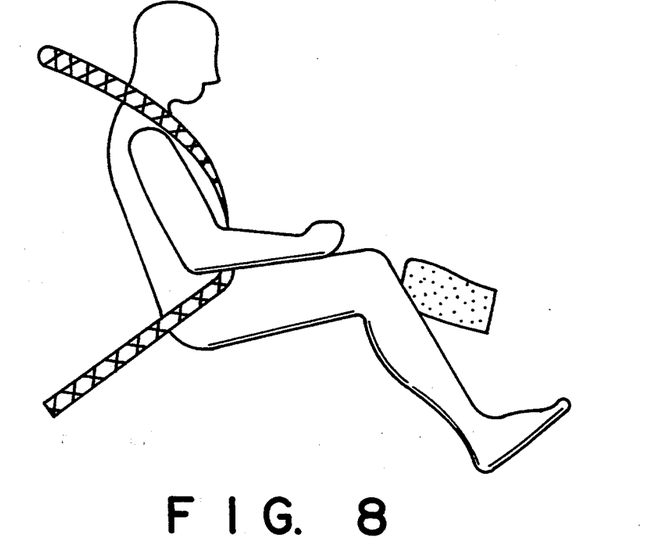
FIG. 8 shows the impact element extended relative to the seating position of a passenger in FIG. 7.

FIGS. 7 and 8 show the effect of the retaining device, constructed in accordance with the present invention, when it is actuated in case of danger to prevent the passenger from sliding downward by blocking the foot space in the vehicle. The downward motion of the passenger is prevented by a rapid extension of a knee protection device. In FIG. 7, on one hand, the freedom of motion of the passenger in the normal condition is shown, while, in FIG. 8, the extended condition of the knee retaining system is shown.

Figure 9:
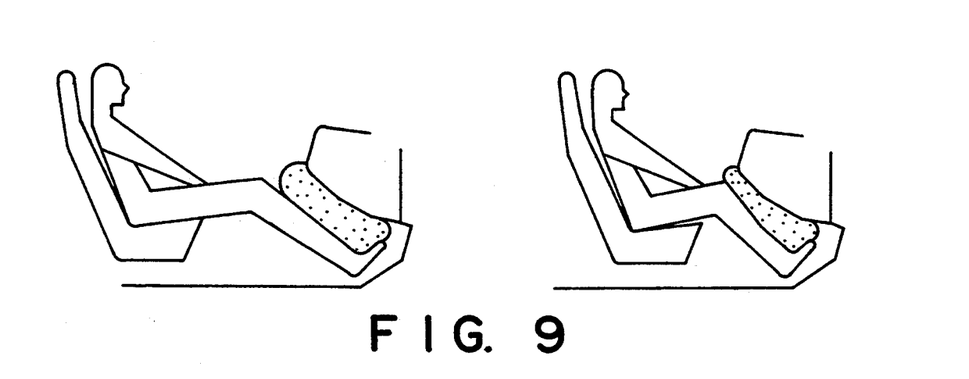
FIGS. 9 to 11 show the application of the inventive retaining system for protection in the knee range both for a passenger on a front seat and for a passenger on a rear seat.
Figure 10:
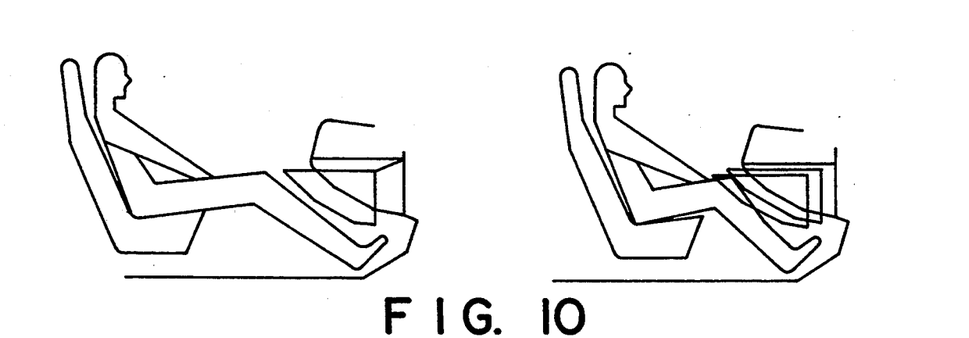
Figure 11:
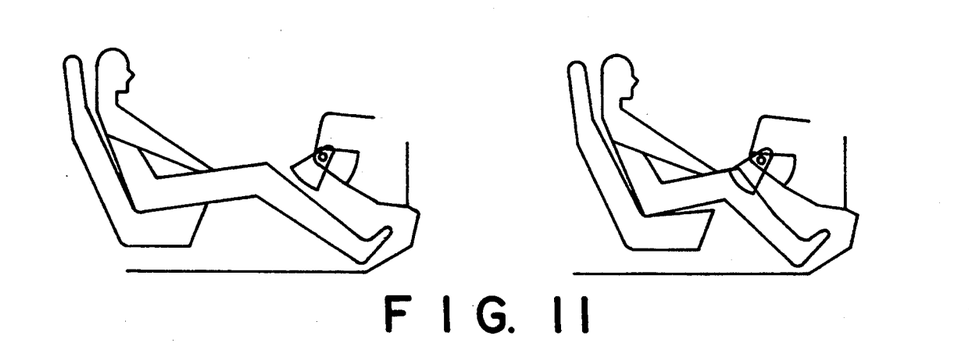

From FIGS. 9 to 11, then, the various possibilities of application of the inventive knee protection device can be seen. In this context, it is important to understand that the knee protection device, according to FIGS. 9 to 11, is applicable just as well for the passenger in one of the rear seats as for the driver or a passenger on the front seats. According to the invention, this protection is provided by an inflatable air bag which, if desired, can bear an impact plate at its front surface facing the passenger. According to FIG. 10, protection of this kind may, however, also be realized by downwardly directed inclined linear extension of the lower part of the instrument panel. In FIG. 11, again for both seating positions, there is shown an impact plate or any other suitable impact element which can swing out to protect the front or the rear passenger.

We claim:

1. A retaining system for passengers of an automotive vehicle, comprising: an impact element movable toward lower limbs of the passenger in a crash situation, and mounted to the vehicle in front of the passenger of the vehicle, wherein:
   (a) said impact element undergoes swingable movement about a swivel axis which extends transversely to the longitudinal axis of the vehicle, and
   (b) said swivel axis is extendable in a translatory direction to cause said impact element to undergo translatory movement toward the lower limbs of the passenger.

2. A retaining system as claimed in claim 1, wherein said swivel axis extends horizontally.

3. A retaining system as claimed in claim 1, wherein:
   the swivel axis lies in a plane above the knees of the passenger; and
   said impact element is swingable toward the knees of the passenger.

4. A retaining system as claimed in claim 3, wherein the swinging movement and the translatory movement of said impact element occur simultaneously.

5. A retaining system as claimed in claim 4, wherein said impact element is a plate.

6. A retaining system as claimed in claim 5, wherein prior to the crash situation, said impact element is the upper limitation for the foot space in front of the passenger.

7. A retaining system as claimed in claim 6, further comprising an energy-consuming damping material mounted on said impact element.

8. A retaining system as claimed in claim 7, further comprising:

drive means, responsive to a detector for detecting the crash situation, for imparting motion to said impact element and said swivel axis upon detection of the crash situation by said detector.

9. A retaining system as claimed in claim 8, wherein said drive means comprise an energy accumulator.

10. A retaining system as claimed in claim 9, wherein:
said impact element is positioned beneath an instrument panel; and
prior to the crash situation, a free end of said impact element points substantially in a forward driving direction of the vehicle.

11. A retaining system as claimed in claim 10, wherein said energy accumulator comprises a telescopic spring arrangement.

12. A retaining system as claimed in claim 11, wherein said energy accumulator comprises one of a torsion spring arrangement, a spiral spring arrangement and a pneumatic drive with a pressure accumulator.

13. A retaining system as claimed in claim 11, wherein said telescopic spring arrangement has linear motion.

14. A retaining system for blocking movement of passengers of an automotive vehicle to the space in front of the seat on which the passengers are seated, said system comprising:
a first impact element;
a second impact element;
first mounting means for mounting said first impact element for:
(a) swinging movement of said first impact element about a first swivel axis, extending transversely to the longitudinal axis of the vehicle, and
(b) translatory movement of said first swivel axis,
the swinging movement of said first impact element and the translatory movement of said first swivel axis combining to move said first impact element toward a first passenger from a first position of said first impact element at which the space in front of the seat on which the first passenger is seated is open to a second position at which the space in front of the seat on which the first passenger is seated is blocked in a crash situation;
first drive means adapted to respond to a detector which detects a crash situation for imparting motion to said first swivel axis and said first impact element upon detection of a crash situation wherein said first drive means comprises a first energy accumulator;
second mounting means for mounting said second impact element for:
(a) swinging movement of said second impact element about a second swivel axis, extending transversely to the longitudinal axis of the vehicle, and
(b) translatory movement of said second swivel axis,
the swinging movement of said second impact element and the translatory movement of said second swivel axis combining to move said second impact element toward a second passenger from a first position of said second impact element at which the space in front of the seat on which the second passenger is seated is open to a second position at which the space in front of the seat on which the second passenger is seated is blocked in a crash situation;
second drive means adapted to respond to said detector which detects a crash situation for imparting motion to said second swivel axis and said second impact element upon detection of a crash situation wherein said second drive means comprises a second energy accumulator; and
a synchronizing shaft connecting said first drive means to said second drive means for:
coordinating the translatory movement of said first swivel axis and the translatory movement of said second swivel axis; and
(b) mounting said first energy accumulator in said first drive means and said second energy accumulator in said second drive means.

15. A retaining system as claimed in claim 13, wherein said impact element is mounted by at least one swinging lever to the vehicle.

16. A retaining system as claimed in claim 15, wherein said impact element is fixed to the instrument panel.

17. A retaining system for blocking movement of a passenger of an automotive vehicle to the space in front of the seat on which the passenger is seated, said system comprising:
an impact element;
mounting means for mounting said impact element for:
(a) swinging movement of said impact element about a swivel axis, extending transversely to the longitudinal axis of the vehicle, and
(b) translatory movement of said swivel axis,
the swinging movement of said impact element and the translatory movement of said swivel axis combining to move said impact element toward lower limbs of the passenger from a first position of said impact element at which the space in front of the seat on which the passenger is seated is open to a second position at which the space in front of the seat on which the passenger is seated is blocked in a crash situation;
and drive means adapted to respond to a detector which detects a crash situation for imparting motion to said swivel axis and said impact element upon detection of a crash situation.

18. A retaining system according to claim 17 wherein said swivel axis is disposed in a plane above the knees of the passenger and said impact element is swingable toward the knees of the passenger.

19. A retaining system according to claim 17 wherein the swinging movement of said impact element and the translatory movement of said swivel axis takes place simultaneously.

20. A retaining system according to claim 17 wherein the translatory movement of said swivel axis takes place first followed by the swinging movement of said impact element.

21. A retaining system according to claim 17 wherein said impact element is a plate.

22. A retaining system according to claim 21 wherein said first position of said impact element is in the upper region of the space in front of the seat on which the passenger is seated.

23. A retaining system according to claim 21 further including an energy-consuming damping material on said impact element.

24. A retaining system according to claim 23 wherein the first position of said impact element is beneath an instrument panel of the vehicle and, while said impact element is in its first position, a free end of said impact element points substantially in the driving direction of the vehicle.

25. A retaining system according to claim 24 wherein said drive means include an energy accumulator having a plurality of telescoping parts and which is urged to expand by a plurality of compressed springs housed in said telescoping parts.

* * * * *

UNITED STATES PATENT AND TRADEMARK OFFICE
CERTIFICATE OF CORRECTION

PATENT NO.    : 5,409,260
DATED         : April 25, 1995
INVENTOR(S)   : Reuber et al.

It is certified that error appears in the above-identified patent and that said Letters Patent is hereby corrected as shown below:

In column 7, claim 12, line 16, delete "11" and substitute therefor --10--

In column 8, claim 14, line 5, add --(a)-- before "coordinating the translatory movement of said first"

In column 8, claim 23, line 55, delete "21" and substitute therefor --22--

Signed and Sealed this

Twenty-ninth Day of August, 1995

Attest:

BRUCE LEHMAN

*Attesting Officer*    *Commissioner of Patents and Trademarks*